June 6, 1961 T. J. WEBBER ET AL 2,986,749
WATER-BORNE FLOAT FOR SUPPORTING PEOPLE
Filed June 12, 1956
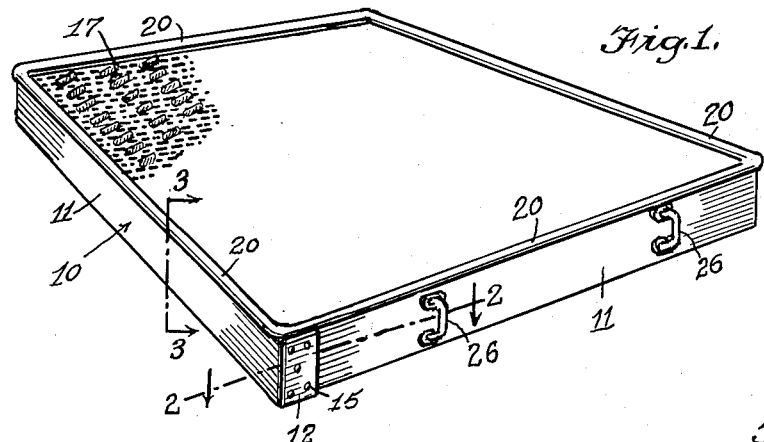
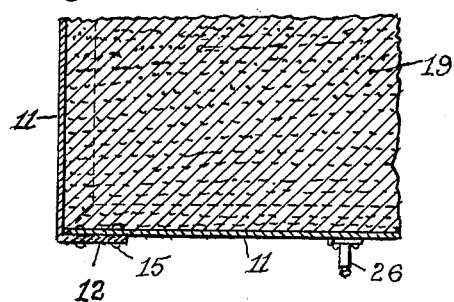
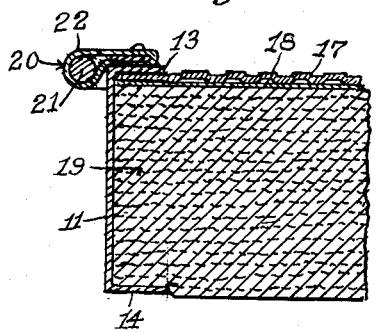
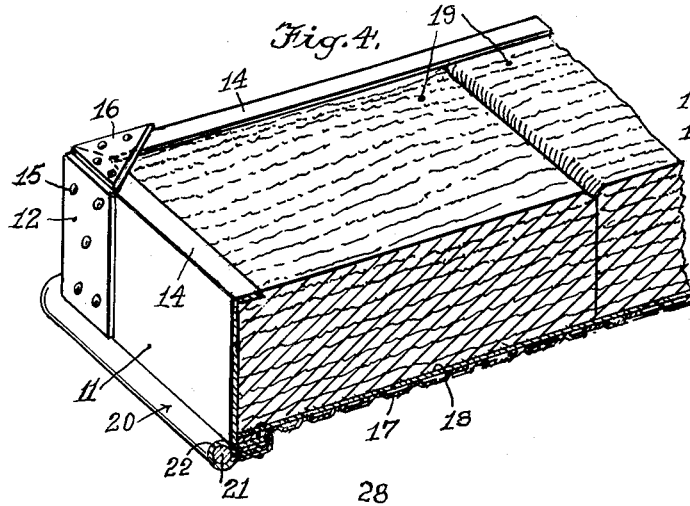
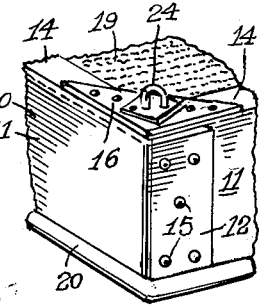
INVENTORS
Thomas J. Webber
BY Irwin S. Bitter
Munn, Liddy, Nathanson & March
ATTORNEYS

United States Patent Office 2,986,749
Patented June 6, 1961

2,986,749
WATER-BORNE FLOAT FOR SUPPORTING PEOPLE

Thomas J. Webber, 348 Willis Ave., Hawthorne, N.Y., and Irwin S. Bitter, Kathleen Lane, Mount Kisco, N.Y.
Filed June 12, 1956, Ser. No. 590,853
3 Claims. (Cl. 9—11)

This invention relates to floats of the type used for supporting people on the surface of the water.

In the past numerous types of floats have been proposed and constructed, using airtight barrels, drums and other buoyant articles or substances, to provide sufficient lifting force for sustaining a number of people. While these prior proposed and constructed floats operated satisfactorily in most instances, they had a number of drawbacks. For example, they were large in depth, bulky and cumbersome, and on the whole represented a considerable amount of weight. Moreover, they were expensive to produce or build, not readily transportable, and not useful as a water-borne conveyance or easily-navigated flotation means. Also, they were subject to rusting and corrosion, rotting or deterioration with age, and hence not always reliable.

The drawbacks and disadvantages attendant these prior floats are obviated by the present invention, and one object of the invention is to provide a novel and improved float which is extremely sturdy and buoyant, while at the same time being of exceptionally light weight and small depth.

Another object of the invention is to provide an improved float as above set forth, which may be easily and conveniently lifted and handled by two ordinary persons, thereby enabling it to be removed from the water whenever desired, and again replaced with a minimum of difficulty.

A further object of the invention is to provide a novel and improved float in accordance with the above, which is not subject to appreciable deterioration with use or age, and which is reliable in its functioning at all times.

Yet another object of the invention is to provide an improved float as characterized, which may be easily, quickly and conveniently transported from one place to another carrying it on the roof of a pleasure car.

A feature of the invention resides in the provision of an improved float of the above type, which may be readily adapted for use with outboard motors, thereby to constitute a water-borne conveyance by which a number of persons may travel from place to place.

A still further object of the invention is to provide an improved float of the above character, which may be readily utilized for hunting or fishing purposes, either as a duck blind or as a fishing platform, and which may be navigated through extremely shallow water.

Other features and advantages will hereinafter appear.

In the drawings accompanying this specification, similar characters of reference indicate corresponding parts wherever possible in the several views, in which:

FIGURE 1 is a perspective view of an improved float made in accordance with the invention.

FIG. 2 is a fragmentary horizontal section taken on line 2—2 of FIG. 1.

FIG. 3 is a fragmentary vertical section taken on line 3—3 of FIG. 1.

FIG. 4 is a fragmentary perspective view of a corner portion of the float, in inverted position.

FIG. 5 is another fragmentary perspective view of a corner portion of the float in inverted position.

FIG. 6 is an edge elevational view of the float, showing the details of a mounting block for use with an outboard motor.

Referring to FIGS. 1–3, the improved float of this invention comprises a relatively rigid, rectangular frame indicated generally by the numeral 10, said frame being advantageously formed of non-corrosive channel members 11 made, for example, of non-corrosive aluminum, joined together at their ends. It is to be understood that any non-corrosive material may be used as the channel members. Four channel members 11 are provided as shown. The ends of the channel members are secured together at each corner by a bracket 12. The channel members are provided with upper and lower flanges 13 and 14. As shown, the bracket is secured to the channel members by means of non-corrosive metal rivets 15. Also, the flanges 13 and 14 are cut along 45-degree lines, to enable them to abut each other, and triangular connecting plates 16 of aluminum are riveted to the adjoining ends of the flanges to supplement the joining of the webs and provide a strong and sturdy overall framework or channel binding means.

By this invention we further provide a novel, sturdy and light floor surfacing, attached to the frame 10, such surfacing comprising two floor plates 17 and 18 of embossed or die-formed aluminum. The aluminum sheets 17 and 18 are secured along their marginal edges to the upper flanges 13 of the frame, as by aluminum or other non-corrosive rivets.

It will be readily understood that by the provision of the aluminum floor plates 17 and 18 we not only effect a light and sturdy surfacing means but also further reinforce the frame 10, thereby to minimize all likelihood of deformation and/or failure of such frame.

Further, in accordance with our invention, we provide as a buoyancy medium within the frame 10 large, relatively-thick slabs 19 of expanded or foam plastic substance such as is currently available on the market, the marginal portions of such slabs fitting between the upper and lower flanges 13 and 14 whereby the slabs are securely held in place beneath the aluminum floor plates 17, 18.

For the purpose of providing a soft and yieldable, non-chafing edge on the frame 10 we provide a resilient bead 20, which may be advantageously formed of a sponge rubber core 21 and a canvas or equivalent covering 22, said bead being secured to the upper flanges 13 of the frame by suitable fastening screws, which may be cadmium plates for corrosion resistance.

To provide a convenient means for anchoring the raft, eyeplates 24 are provided at the corners of the frame 10, secured to the corner reinforcing plates 16, as shown in FIG. 5.

The improved raft of our invention as above constituted is relatively light in weight, and accordingly we provide pairs of handles or hand grips 26 at opposite sides of the frame 10, thereby to enable the raft to be easily and conveniently lifted and handled by two people. We have found that a raft made in accordance with the above structure, having sufficient buoyancy to support safely approximately thirteen hundred pounds, will weigh in the neighborhood of 120 pounds, and that a raft weighing only 134 pounds will support approximately twice the above load. Thus our improved raft is sufficiently light and sturdy to be readily transportable. By virtue of the non-scratching foam plastic slabs 19 being fully exposed at the underside of the raft, the latter may be readily placed on top of a pleasure vehicle and supported thereby, without danger of scratching the vehicle finish as from projecting screws, bolts or other structural members. Of course, a blanketing member may first be placed on the roof of the vehicle, to further prevent any slight abrasion of the finish from occurring.

However, by virtue of the above construction we have found that our raft may be readily transported from place to place on the roof of a car. Moreover, by the provision of the side handles 26, a mounting block 28 may be readily secured to one side or frame member of the raft and held in place by suitable wedges 29, thereby to enable an outboard motor to be affixed to the raft for the purpose of propelling and also steering the same. Thus the raft may be readily converted to a water-borne conveyance, and may also be used as a duck blind, or as a fishing platform. Due to the advantageous buoyancy and light weight of the raft, it takes but a few inches of draft, and thus may be made to navigate relatively shallow water.

Variations and modifications may be made within the scope of the claims, and portions of the improvements may be used without others.

We claim:

1. A raft comprising a foam plastic structure of buoyant characteristics, said structure comprising a plurality of foam plastic slabs; a non-corrosive frame extending around the perimeter of said structure, said frame having integral flanges overlapping and extending inwardly of both the upper and lower edges of said structure to confine the outer edge portions of the slabs; and a non-corrosive laminated floor plate attached to said inwardly extending flanges on one side of said structure and covering one surface of said slabs, the opposite surface of said slabs being open except around the outer perimeter thereof.

2. The invention as defined in claim 1 in which there is a resilient bead secured to the upper portions of the frame and projecting outwardly therefrom, said bead having a non-metallic, wear resistant surfacing.

3. The invention as defined in claim 1 comprising handles secured to a side of the frame, one pair of said handles being spaced apart by predetermined distance; and a mounting block having ends extending out a greater distance than said distance between said pair of handles, the ends of said block fitting into said pair of handles and being wedged therein whereby said block forms a support adapted to mount an outboard motor.

References Cited in the file of this patent

UNITED STATES PATENTS

| | | |
|---|---|---|
| 293,321 | Grell | Feb. 12, 1884 |
| 1,060,294 | Snouffer | Apr. 29, 1913 |
| 1,107,652 | Burton | Aug. 18, 1914 |
| 1,514,961 | Goldman | Nov. 11, 1924 |
| 2,564,051 | Bush | Aug. 14, 1951 |
| 2,605,866 | Jernstrom | Aug. 5, 1952 |
| 2,879,735 | Pointer | Mar. 31, 1959 |

FOREIGN PATENTS

| | | |
|---|---|---|
| 540,304 | France | Apr. 14, 1922 |
| 734,640 | Great Britain | Aug. 3, 1955 |

OTHER REFERENCES

Popular Mechanics, August 1954, vol. 102–2, page 111.